(12) United States Patent
Shan et al.

(10) Patent No.: US 8,126,901 B2
(45) Date of Patent: Feb. 28, 2012

(54) METHOD AND APPARATUS FOR GENERATING A DYNAMIC WEB PAGE

(75) Inventors: Jian Hong Shan, Beijing (CN); Shao Yang Yu, Hai Dian District (CN); Zhong Yan Lu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 11/863,860

(22) Filed: Sep. 28, 2007

(65) Prior Publication Data
US 2008/0098028 A1    Apr. 24, 2008

(30) Foreign Application Priority Data
Oct. 19, 2006  (CN) .......................... 2006 1 0135774

(51) Int. Cl.
G06F 17/30    (2006.01)
G06F 7/00     (2006.01)
(52) U.S. Cl. ........................................ 707/756; 707/802
(58) Field of Classification Search .................. 707/756, 707/802
See application file for complete search history.

(56) References Cited

U.S. PATENT DOCUMENTS
5,835,712 A * 11/1998 DuFresne ..................... 709/203
(Continued)

FOREIGN PATENT DOCUMENTS
JP    2001-125855    5/2001

OTHER PUBLICATIONS
Final Office Action mailed Mar. 1, 2011 for U.S. Appl. No. 12/129,028, filed May 29, 2008. Non-Final Office Action mailed Sep. 17, 2010 for U.S. Appl. No. 12/129,028, filed May 29, 2008.

*Primary Examiner* — Tim T Vo
*Assistant Examiner* — Sangwoo Ahn
(74) *Attorney, Agent, or Firm* — Stephen Bongini; Fleit Gibbons Gutman Bongini & Bianco PL

(57) ABSTRACT

A method and apparatus are provided for generating a dynamic web page. A structured data context is generated based on the result of a business logic process performed in response to a request from a browser, and a template associated with the request is loaded. The structured data context includes at least one dynamic data item for the dynamic web page. The template is able to be browsed by the browser and contains associated information that corresponds to the at least one dynamic data item of the structured data context. The at least one dynamic data item of the structured data context is merged into the template so as to produce the dynamic web page.

17 Claims, 3 Drawing Sheets

U.S. PATENT DOCUMENTS

| | | |
|---|---|---|
| 6,714,928 B1 | 3/2004 | Calow |
| 7,111,231 B1 * | 9/2006 | Huck et al. .................... 715/205 |
| 7,117,436 B1 * | 10/2006 | O'Rourke et al. ............ 715/205 |
| 2003/0226110 A1 * | 12/2003 | Scheering ..................... 715/513 |
| 2004/0015476 A1 | 1/2004 | Twaddle |
| 2004/0225633 A1 | 11/2004 | Jau |
| 2008/0228809 A1 | 9/2008 | Shan et al. |

* cited by examiner

METHOD AND APPARATUS FOR GENERATING A DYNAMIC WEB PAGE

CROSS-REFERENCE TO RELATED APPLICATIONS

This application is based upon and claims priority from Chinese Patent Application No. CN920060059, filed Oct. 19, 2006, the entire disclosure of which is herein incorporated by reference.

FIELD OF THE INVENTION

The present invention relates to information processing technology, and more particularly relates to generating a dynamic web page.

BACKGROUND OF THE INVENTION

In any browser-based architecture, no matter what presentation techniques and architecture designs are employed at the back-end server side, it must finally return to a browser markup language that can be recognized by the browser, such as HTML (Hyper Text Markup Language), XML (eXtensible Markup Language), WML (Wireless Markup Language), etc.

When generating a dynamic web page, usually web page designers (e.g., art designers) will first design a template, and then the template is populated by developers to realize various dynamic functions (such as dynamic data presentation). The design template is, for example, an HTML design template. Generally, a web page designer (e.g., art designer) only has web page design related skills (for example, only understands the HTML language), and does not have any non-web page design related skills (such as understanding the java language). During development of dynamic web pages, a developer that has no or only a small amount of web page design related skills is responsible for back-end program encoding and dynamic data generating, but not responsible for controlling presentation style of the web page. A developer can utilize, for example, Perl, Tcl, Java, Python, ASP and many other languages and tools to populate the template in order to realize generation of dynamic data.

There are many popular methods for presenting dynamic data of web pages, for example, Servlet+JSP (JavaServer Page) (or with JSP TagLibs), Velocity, XMLC (eXtensible Markup Language Complier), etc. However, the present methods all require web page designers and developers to cooperatively develop the same template file. For example, first the web page designer finishes the template file (based on a markup language that can be recognized by a standard browser, such as HTML or WML), and then the developer modifies this file and populates program codes that can only be understood by the developer. This inevitably destroys the standard property of the original template file, and possibly causing the modified template to not be recognized by the standard browser. This presents a great challenge for subsequent maintenance by the web page designer, because a lot of program languages that cannot be understood by the web page designer are added into the template, so that the web page designer can no longer perform maintenance with the original web page editor. This will be further described in the following, by taking part of the typical existing techniques as an example.

A Servlet is a kind of Java application running on a web server or application server and is used to provide a server side process, such as accessing a database, etc. The Servlet couples presentation markup content with business logic processes.

The following is a sample snippet of a Servlet.

```
response.setBufferSize ("8*1024");
response.setContentSize ("text/html");
PrintWriter out = response.getWriter ( );
out.println ("<HTML>");
out.println ("<HEAD> <TITLE> Servlet Output</TITLE> </HEAD>");
out.println ("<BODY>");
out.println ("<P> Welcome To this World </P>");
out.println ("</BODY>");
println ("</HTML>");
```

Usually, the development flow using the Servlet technique is as follows: the web page designer writes a standard template file (such as an HTML file), then the developer writes servlet code that contains all the templates, with these codes being embedded standard java logic code to display dynamic data. However, the disadvantage of servlet technology is obvious: it is very hard to split presentation markup content and business logic processes. And for further maintenance it is a disaster because any display related data modification (such as changing the font, layout, etc.) requires direct modification of java code, and therefore the whole servlet code needs to be re-compiled and re-deployed.

JSP is an extension to servlet technology, which allows HTML and Java to be incorporated within the same page file, for example, inserting Java into a markup page to produce dynamic content, with Java providing business logic processes, and HTML providing the page that is presented in a web page browser.

A JSP file accesses JavaBean or other components that can send generated dynamic content to a browser. When a web server receives a JSP file request, it sends the request to an application server (such as IBM WebSphere). The application server parses the JSP file and generates a Java source file (which is compiled and run as a Servlet). Unless the original JSP file has been updated, the generation and compilation of the JSP source file do not happen until the first invocation of the Servlet. In this case, the application server will detect the update that was made and re-generate and compile the Servlet before executing it.

The following is a sample snippet of JSP.

```
<% @ page import = "java.util.Date, java.text.DateFormat" %>
<HTML>
<BODY>
<P> Welcome to JSP development where the time is: <% =
DateFormat.getTimeInstance ( ) .format((new Data( ))) %>
</BODY>
</HTML>
```

Although it is not necessary to write presentation markup in programming for JSP, the web page designer and developer must be able to handle/understand the Java program and business logic embedded in the page, which is very difficult for a web page designer because a web page designer can only understand standard HTML and cannot understand any Java program embedded in the HTML. There is great difficulty if it is required at this time for the web page designer to make a post page style modification. A lot of non-HTML standard marked codes are added into the template file at this time, and page edit tools will become unavailable.

Velocity is a Java-based template engine, which permits anyone to use simple and powerful template language to reference objects defined in Java code. Web designers can work in parallel with Java programmers to develop web pages according to Model/View/Controller (MVC) architecture, meaning that web page designers can focus solely on designing web pages, and programmers can focus solely on writing codes.

The following is a sample snippet of Velocity.

```
<HTML>
<BODY>
Hello $customer.Name!
<TABLE>
#foreach($mud in $mudsOnSpecial)
#if($customer.hasPurchased($mud))
<TR>
<TD>
$flogger.getPromo($mud)
</TD>
</TR>
#end
#end
</TABLE>
</BODY>
</HTML>
```

But actually, Velocity template language is very similar to a Java program in JSP. For web page designers, a lot of business logic or other language that cannot be understood are embedded in the template file. Moreover, within a Velocity template, it is required to use its customized VTL (Velocity Template Language). After VTL is added, this template is no longer pure HTML, which also requires that the page developer have certain front-end programming skill. A template which has VTL added into it could not be recognized by a standard HTML editor. Furthermore, Velocity's Merge Engine is centered on a template, i.e., it first reads a template, then compiles the template file and at the same time interprets the VTL embedded in the template, with the VTL accessing Data Context so as to perform dynamic data replacement. Velocity's context is just a data storage center, and there is only data in it without any presentation related information (how to present the data is interpreted by VTL in the template). For example, if there are 10 records to be displayed in a page while there are 20 pieces of data returned by business logic, Velocity's context will put in the 20 pieces of data, then 1-10 will be displayed in cycle by VTL in the template, that is, the display is controlled by the template. All of which have demanded higher requirements for developers.

The XMLC method is to compile a markup language page (such as HTML, XML, or WML) to generate a corresponding Java class. This Java class contains the page's complete DOM (Document Object Model) tree structure and its operation method, so that it can process any content and its attribute on the page. More importantly, in XMLC, dynamic content is cleverly associated with the ID attribute in HTML and corresponding operation methods are generated in the Java class, for example, change attribute of text content, etc. Unlike JSP, XMLC does not introduce any extra HTML/XML tag attribute, but just reuses the ID attribute. Therefore, actually XMLC can process any markup language, not only XML, HTML, and WML.

XMLC processes a markup language page via 3 steps, the work flow of which is as follows.

1. Check whether the input document (HTML, XML, WML, etc.) is valid and whether the tag is legal and complete.

2. Generate a set of Java classes which represents the input document (page) as related DOM tree in development phase. In practice, an instance of such class is created, and the DOM tree of the page can be manipulated by using an instance of this class.

3. A Java method that handles dynamic content is generated. The dynamic content only needs to be marked with ID.

It can be seen that this method has significantly reduced the Java developer's workload on processing a page's dynamic content.

Although XMLC uses standard HTML as the template and uses the ID attribute of HTML as keyword or locating, XMLC requires using its compile tool at the development stage for pre-compiling and compiling the template file into a stack of Java classes. Each Java class encapsulates therein attribute and operation method of the corresponding node in the template, then a programmer introduces these classes in business logic, and assigns values to these nodes through an API (Application programming interface). Finally, the Java program is run to output HTML content. XMLC do not have the concept of Merge Engine and at the same time, the template file is only valid during development, and what is used during runtime is the compiled Java class.

In contrast to Servlet, JSP, and Velocity, XMLC is quite simple for page designers (it is based on a pure HTML template), but more complex for business developers, because when a page (template) changes a little, they have to re-compile the HTML template into a DOM tree, and fix the compile errors (for example <TR>..<TR> should be <TR>..</TR>)

Therefore, there is a need for a technique to generate dynamic web pages based on a template that can be browsed (interpreted) by a browser, so that it is simple for both page designers and developers and makes the relation between them simple, such that either can easily read and understand a modification made by the other.

SUMMARY OF THE INVENTION

To solve the above problems, the present invention provides a method for generating a dynamic web page and an apparatus for generating a dynamic web page.

According to one aspect of the present invention, there is provided a method for generating a dynamic web page. According to the method, a structured data context is generated based on the result of a business logic process performed in response to a request from a browser, and a template associated with the request is loaded. The structured data context includes at least one dynamic data item for the dynamic web page. The template is able to be browsed by the browser and contains associated information that corresponds to the at least one dynamic data item of the structured data context. The at least one dynamic data item of the structured data context is merged into the template so as to produce the dynamic web page.

According to another aspect of the present invention, there is provided an apparatus for generating a dynamic web page. The apparatus includes a business logic processing unit configured to generate a structured data context based on the result of a business logic process performed in response to a request from a browser, and a template loading unit configured to load a template associated with the request. The structured data context includes at least one dynamic data item for the dynamic web page. The template is able to be browsed by the browser and contains associated information that corresponds to the at least one dynamic data item of the structured data context. The apparatus also includes a merging unit configured to merge the at least one dynamic data item of the structured data context into the template so as to produce the dynamic web page.

BRIEF DESCRIPTION OF THE DRAWINGS

It is believed that the above and other features, advantages and objects of the present invention will be better understood from the description of the detailed implementation of the present invention in conjunction with accompany drawings, in which.

DETAILED DESCRIPTION OF PREFERRED EMBODIMENTS

Various embodiments of the present invention will now be described in detail in conjunction with the accompany drawings.

Figure 1:
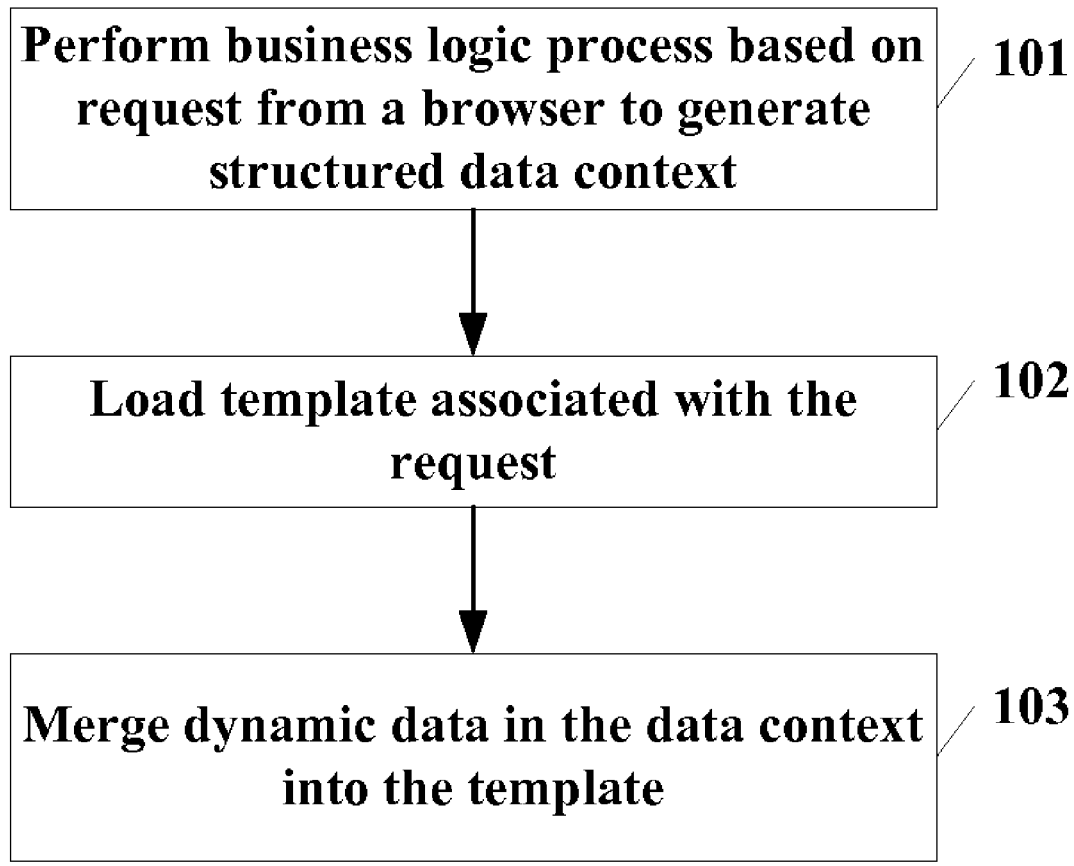
FIG. 1 is a flowchart of a method for generating a dynamic web page according to one embodiment of the present invention.

FIG. 1 is a flowchart of a method for generating a dynamic web page according to one embodiment of the present invention. In FIG. 1, first at step 101, the result of a business logic process is obtained based on a request from a browser, and a structured data context is generated from the business logic process result, with the data context comprising one or more dynamic data items for dynamic web pages.

In particular, the request from the browser comprises any web request (for example, a user request that queries the balance at an online bank, a request to perform authentication when a user logs into an account, a request to perform searching based on certain keywords, etc.). The present invention is not limited to any specific requests. The present invention focuses on how to present a business logic process result to the browser; how to obtain the result of the business logic process based on a request from the browser can employ any process.

The term "business logic" in step 101, and more generally in the context of the present invention, refers more to a semantic term, rather than a technical term. Any code regarding a business process can be called "business logic". That is, it relates to any system whose purpose is: accept input parameter from user ==> perform business (transaction) based on the input parameter ==> return display result. Whatever the system, they are all based on this basic flow. Here, the business (transaction) performed based on the input parameter is the so-called "business logic".

The business logic process performed in step 101 will be described in detail in the following through two examples.

The first example is a request to query balance. First, a user inputs the account number via a user interface (UI) (or a counter system's fat client based system, or a browser page of an online bank used by an ordinary bank customer), then presses the submit button.

Next, this request to query balance is sent to a back-end server, and this request is accepted by a certain application at the back-end.

Next, the application extracts the parameter (here, the account number input by the user) from the request and hands it off to one or more subprograms for processing to obtain the balance corresponding to that account. Here, the "one or more subprograms" is the so-called "business logic". There are various implementations of business logic, which are realized solely by the system's own design and code. For example, here it can be an ordinary class to directly query a database to obtain the balance information. Alternatively, it can be handed off to a remote application for processing via EJB (Enterprise JavaBeans), with the account parameter being equal to one input of the remote application and being handled by that remote application to obtain the balance information. Alternatively, based on an SOA (Service-Oriented Architecture) architecture, this account parameter may be handed off to a component of the Enterprise Service Bus (ESB) so as to enter a flow to access a host via a connector of JCA (Java Connector Architecture). No matter how this procedure is designed (simple or complex), the purpose of it is to obtain the user's balance based on the account information that was input, and this procedure can be called "business logic".

The account balance is obtained after the business logic process. That account balance is the result of the business logic process, and the account balance needs to be returned to the user interface (i.e., dynamic web pages that request response). So the process result contains one or more dynamic data items for generating the dynamic web pages that request response. In step 101, the business logic process result is generated into a structured data context.

The second example is a request to perform authentication. First, a user inputs a user name and a password, and then submits the request.

Next, the request is sent to a back-end server and a corresponding application program is started to acquire the user name and password from the request.

Next, the acquired user name and password are sent to corresponding business logic to authenticate if the user name and password are correct. This business logic can be direct access to a database to compare the user name/password, or handed off to a remote application service such as EJB, SOA or LDAP (Lightweight Directory Access Protocol), which the user name/password being used as the input of the remote application.

Next, the business logic will return an output that is the business logic process result obtained in step 101, and the business logic process result is used for the dynamic web pages that request response (for example, prompting that the user name/password is incorrect, or giving a signal indicating that the authentication passed). At this time, the business logic ends. Since the process result contains one or more dynamic data items for generating the dynamic web pages that request response, in step 101 the business logic process result will be generated into a structured data context. Here, the structured process may be understood as generating a specific data structure or data class, etc. to facilitate subsequent processing.

Figure 2:
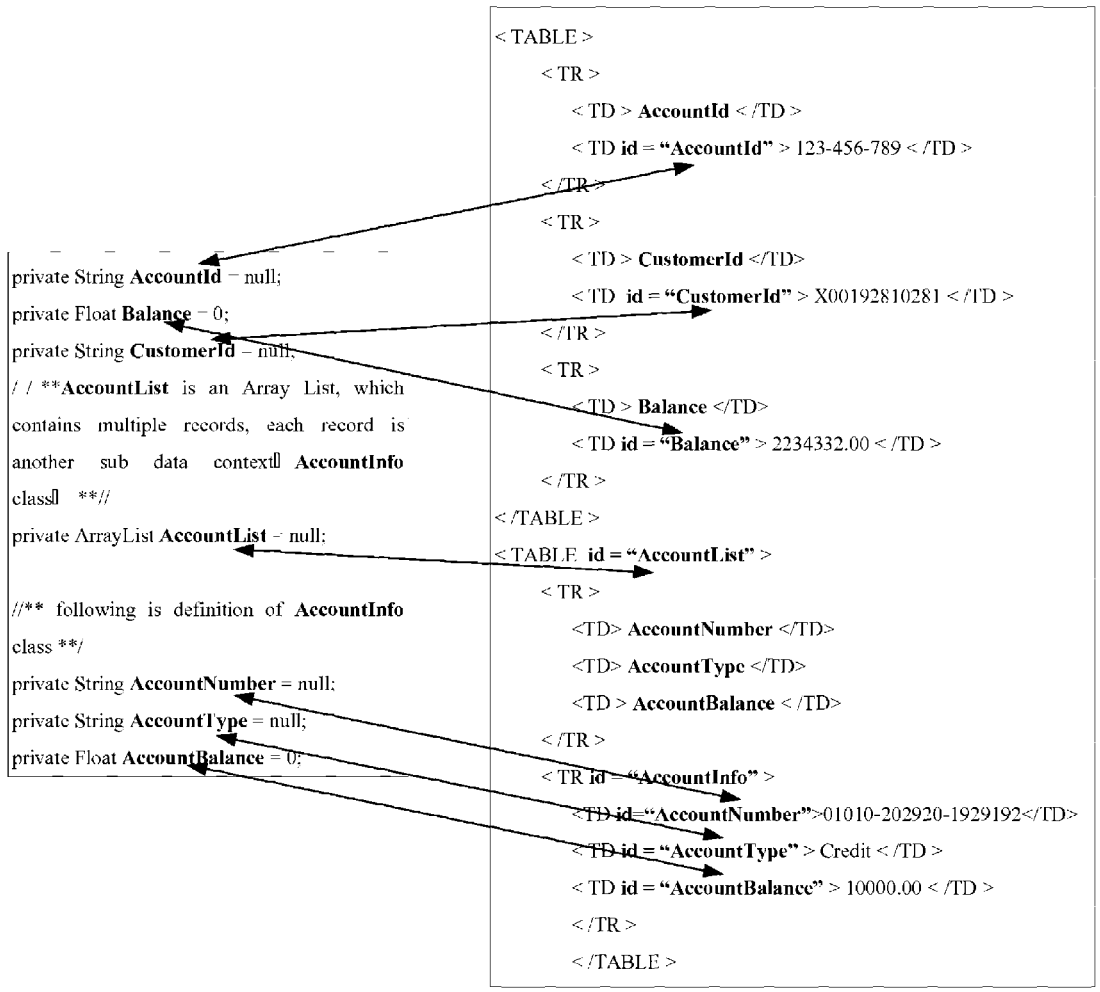
FIG. 2 is a diagram of corresponding relationships between a data context and a pure HTML template according to one embodiment of the present invention.

The box on the left in FIG. 2 shows an example of a structured data context generated in step 101, with the structured data context containing one or more dynamic data items for dynamic web pages. In this example of the data context, AccountId, CustomerId, and Balance are data of basic type, while AccountList is an Array List that is used to store a plurality of data structures with each line within the Array List being another data context (that is, an AccountInfo class that is used to store any data, for example, dynamic data items of AccountNumber, AccountType and AccountBalance).

In summary, "business logic" is a very generalized expression representing real business process logic code and not having any relationship with any specific technique or algorithm implementation. In this step, it is only important to obtain the process result of business logic, while how to process business logic is unimportant (i.e., it can be processed in any way). How to use the structured data context generated in step 101 and the dynamic data items contained in the data context will be described in detail with reference to the following step.

Next, at step 102, a template associated with the request from the browser is loaded, with the template being capable of being browsed by a browser and containing associated information corresponding to one or more dynamic data items in the data context.

The template is the working result of the web page designer. The development procedure of a conventional general dynamic web site is: first the web page designer develops static web page (e.g., pure HTML), then hands it to the developer. The business developer modifies this static web page and embeds therein business logic or display logic, so that this web page can display dynamic data. At this point, this modified web page is the so-called "template" of the conventional development procedure. These templates are stored at the application server side and an application program is responsible for reading and interpreting them based on different requests. These template files are finally compiled and run as marks (such as HTML) that can be recognized by a standard browser, which are returned to the client request to be displayed at the client side. The association of a template with a request is determined by the client's application program. One common implementation is: a template file is directly associated with a request. For example, if the URL (Uniform Resource Locator) requested by a user is "http://www.sample.com/myweb/account.jsp", then a template file named "account.jsp" is directly called.

The conventional template is not a template represented by pure markup language. That is, it must be compiled and run before it can be browsed by a browser. On the other hand, embodiments of the present invention employ a template represented by pure markup language. This template represented by pure markup language is a template represented by a markup language that can be directly interpreted by a browser (e.g., a browser used by the web page designer). For example, if the IE browser can interpret HTML and the WIN WAP browser can interpret WML, then a pure HTML template is a template represented by pure markup language, and a pure WML template is also a template represented by pure markup language. The markup language that generates the template can include, for example, HTML, XML, WML, etc., and any other existing or future developed markup language. The present invention is not limited to any specific markup language. When performing the request response's browser presentation with a template represented by pure markup language, there is no need for a web page designer to understand program language, and there is no need to re-compile the code.

Additionally, the associated information contained in the template that corresponds to the one or more dynamic data items in the data context is recorded in attributes of tags within the template. The attributes can be, for example, ID (identifier) attributes or other attributes in an HTML, XML, WML, etc. template, as long as they can associate dynamic data items in the data context with dynamic content in the template.

This exemplary embodiment of the present invention will now be described by taking a pure HTML template formed by pure HTML tags as an example. A pure HTML template can be browsed by a typical browser, for example, the IE browser. The pure HTML template is written by the web page designer in advance and is stored on a server.

An example of pure HTML is as follows.

```
<input type = "input" name = "userName" value = "my name" id = "userName">
```

All the information contained therein is standard HTML syntax and there does not appear any non-HTML syntax, so it is called "pure HTML".

The following example is not pure HTML.

```
<input type = "input" name = "userName" value =
  "<%=formBean.getUserName( )%>">
```
Note that "<%=formBean.getUserName( )%>" is not standard HTML syntax, but is java logical code that cannot be directly recognized by a browser. So, it is not called "pure HTML".

The box on the right in FIG. 2 is one example of a pure HTML template that does not have any non-HTML standard mark and can be directly displayed in the IE browser. It is displayed in the browser as the following two tables.

| AccountId | 123-456-789 | CustomerId | X00192810281 |
|---|---|---|---|
| Balance | 2234332.00 | | |

| AccountNumber | AccountType | AccountBalance |
|---|---|---|
| 01010-202920-1929192 | Credit | 10000.00 |

For the pure HTML template in the box on the right of FIG. 2, take one or more tags' ID attribute as the associated information corresponding to the one or more dynamic data items in the data context, for example, containing AccountId, CustomerId, Balance, and AccountList (with AccountList being an Array List and containing a plurality of records therein, with each record being another sub data context (AccountInfo class), and the AccountInfo class in turn containing ID attributes AccountNumber, AccountType and AccountBalance). The marked content corresponding to these ID attributes can be replaced by dynamic data in the data context within the box on the left of FIG. 2. FIG. 2 shows the corresponding relationship between the data context on the left and the template on the right. The template on the right of FIG. 2 is a template associated with the request from the browser. The pure HTML template and its ID attributes are shown for illustrative purpose only, and the present invention is applicable to other markup languages (e.g., XML, WML, etc.) and their attributes.

The structure of the data context should correspond to display logic, and the attribute name and hierarchy location in the generated structured data must correspond to respective ID attributes defined in the pure HTML template.

Next, at step 103, one or more dynamic data items in the data context are merged into the template.

Specifically, the method for merging the one or more dynamic data items into the template can be any known method, which includes but is not limited to the following: traversing each data item in the generated data context; and placing the data items in corresponding locations in the template if associated information corresponding to the data item is found in the template.

For example, for the pure HTML template, each dynamic data item in the generated data context is traversed, and the dynamic data items are placed into corresponding locations in the pure HTML template if the ID attribute corresponding to the dynamic data items is found in the pure HTML template. Furthermore, error information is reported when there is no ID attribute corresponding to the dynamic data items in the generated data context within the pure HTML template. In addition, error information is reported when there is a value of an ID attribute in the pure HTML template that is not replaced by corresponding dynamic data after the traverse is completed. The traversal method and error reporting method can utilize any known method. For example, character string lookup matching, encoding occurrence location of ID attributes or splitting a template into DOM nodes etc. can be used. The present invention is not limited to any specific method and methods are not described in detail for brevity.

In addition, the process can include checking syntax of the template to find any written errors therein before step 103, and checking syntax of generated web pages after merging so as to find any errors produced during merging after step 103. The method for checking syntax can utilize any known method, for example, mark match principle check, site location check etc. The present invention is not limited to any specific method and method are not described for brevity.

Accordingly, the method for generating a dynamic web page of this embodiment of the present invention utilizes a template represented by pure markup language and does not need to compile the template with an additional compiler, so as to simplify the process for generating dynamic web pages. By using the template represented by pure markup language, web pages can be designed by employing any existing markup language design tools, so that no other technical requirement is required for a web page designer. In addition, the web page's entire development process and the implementation of dynamic features are all based on markup language, and no script or labels that are not in markup language are introduced, so that relations between web page designers and developers are made simple. Moreover, the method of this embodiment does not need to perform any pre-processing on the template, what is needed is performing corresponding replacement on dynamic data items therein during runtime, so it is a simple and effective method for generating web pages.

Figure 3:
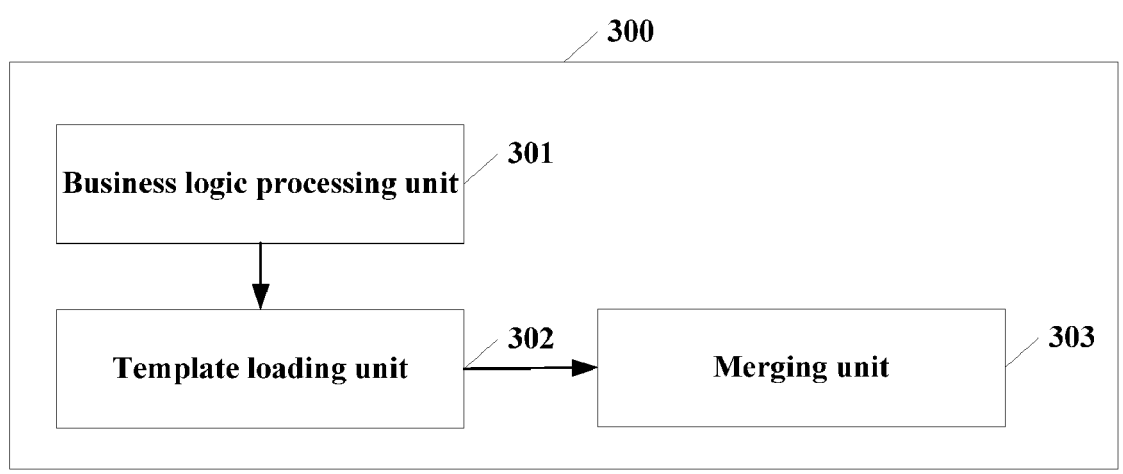
FIG. 3 is a block diagram of an apparatus for generating a dynamic web page according to an embodiment of the present invention.

FIG. 3 is a block diagram of an apparatus for generating a dynamic web page according to an embodiment of the present invention. For parts that are the same as in the above embodiment, a detailed description is omitted.

In FIG. 3, the apparatus 300 for generating a dynamic web page comprises a business logic processing unit 301 configured to generate a structured data context based on the result of a business logic process obtained in response to a browser's request, with the data context comprising at least one dynamic data item for the dynamic web page. The apparatus 300 also comprises a template loading unit 302 configured to load a template associated with the request, with the template able to be browsed by a browser and containing associated information corresponding to the at least one dynamic data item in the data context; and a merging unit 303 configured to merge the at least one dynamic data item in the data context into the template.

In particular, the request from the browser received by business logic processing unit 301 comprises any known web request, for example, a user request that queries the balance at an online bank, a request to perform authentication when a user logs into an account, a request to perform searching based on certain keywords, etc. The present invention is not limited to any specific request.

As explained above, the "business logic" performed by business logic processing unit 301 refers more to a semantic term, rather than a technical term. Any code regarding a business process can be called "business logic". That is, it relates to a system whose purpose is: accept input parameter from user ==> perform business (transaction) based on the input parameter ==> return display result. Whatever the system, they all based on this basic flow. Here, the business (transaction) performed based on the input parameter is the so-called "business logic".

For an example that describes the type of business logic that can be performed by business logic processing unit 301, see the example above relating to the method for generating a dynamic web page. It will not be described again for brevity.

In summary, "business logic" is a very generalized expression representing real business process logic code and not having any relationship with any specific technique or algorithm implementation. The data context generated by business logic processing unit 301 and the dynamic data contained in the data context will be described in detail in the following.

A template associated with the request from the browser received by business logic processing unit 301 is loaded by template loading unit 302, with the template being able to be browsed by a browser and containing associated information corresponding to one or more dynamic data items in the data context.

Specifically, the template loaded by template loading unit 302 is a template represented by a markup language that can be interpreted by a browser (for example, a browser used by the web page designer). The markup language can include, for example, HTML, XML, XML, etc., and any other existing or future developed markup language. The present invention is not limited to any specific markup language.

The associated information contained in the template corresponding to the one or more dynamic data items in the data context are recorded in attributes of tags within the template. The attributes can be, for example, ID (identifier) attributes or other attributes in an HTML, XML, or WML template, as long as they can associate dynamic data items in the data context with dynamic content in the template.

For the example of a pure HTML template formed by pure HTML tags, see the example above relating to the method for generating a dynamic web page. It will not be described again for brevity.

The merging unit 303 merges the one or more dynamic data items in the data context generated by the business logic processing unit 301 into the template loaded by the template loading unit 302.

The merging unit 303 that merges the one or more dynamic data items into the template can be any known unit, which includes but is not limited to a unit that includes: a traversing unit for traversing each data item in the generated data context, and a placing unit for placing the data items in corresponding locations in the template if associated information corresponding to the data item is found in the template.

For example, for the pure HTML template, the traversing unit traverses each dynamic data item in the generated data context, and the placing unit places the dynamic data items in corresponding locations in the pure HTML template if ID attributes corresponding to the dynamic data items are found in the pure HTML template. Furthermore, the merging unit 303 further comprises an error reporting unit. When there is no ID attribute corresponding to the dynamic data items in the generated data context within the pure HTML template, the error reporting unit reports that error information. In addition, when there is a value of ID attributes in the pure HTML template that is not replaced by corresponding dynamic data after the traverse is completed, the error reporting unit reports that error information. The traversing unit, placing unit, and error reporting unit can be any known unit. For example, a character string lookup matching unit, an encoding unit for encoding occurrence locations of ID attributes or a unit for splitting a template into DOM nodes etc. can be used. The present invention is not limited to any specific unit and specific units are not described for brevity.

In addition, the apparatus 300 for generating a dynamic web page of this embodiment further comprises a syntax checking unit, which checks syntax of the template to find any errors therein before merging unit 303 performs the merging, and checks syntax of the generated web pages to find any errors produced during merging after merging unit 303 performs the merging. The syntax checking unit can be any known unit, for example, a mark match principle checking unit, a site location checking unit etc. The present invention is not limited to any specific unit and specific units are not described for brevity.

Accordingly, the apparatus for generating a dynamic web page of this embodiment of the present invention utilizes a template represented by pure markup language and does not need to compile the template with an additional compiler, so as to simplify the process for generating dynamic web pages. By using the template represented by pure markup language, web pages can be designed by employing any existing markup language design tools, so that no other technical requirement is required for a web page designer. In addition, the web page's entire development process and implementation of dynamic features are all based on markup language, and no script or labels that are not in markup language are introduced, so that relations between web page designers and developers are made simple. Moreover, the apparatus of this embodiment does not need to perform any pre-processing on the template, what is needed is performing corresponding replacement on dynamic data items therein during runtime, so it is a simple and effective apparatus for generating web pages.

The present invention can take the form of an entirely hardware embodiment, an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Although a method for generating a dynamic web page according to the present invention and an apparatus for generating a dynamic web page according to the present invention have been described in detail through some exemplary embodiments, these embodiments are not meant to be exhaustive. Various variations and modifications can be made therein by those of ordinary skill in the art without departing from the spirit and scope of the present invention. Therefore, the present invention is not limited to these embodiments, but its scope is only defined by the accompany claims.

What is claimed is:

1. A computer-implemented method for generating a dynamic web page, the method comprising the steps of:
generating, by a processor, a structured data context based on a result of a business logic process performed in response to a request from a browser, the structured data context defining at least one of a given data structure and a given data class, the structured data context including at least one dynamic data item for the dynamic web page, and the structured data context being separate and distinct from the dynamic web page and being generated prior to generating the dynamic web page;
loading a template in response to the request, the template being able to be browsed by the browser and containing associated information that corresponds to the at least one dynamic data item of the structured data context, the associated information being recorded in an attribute of a tag in the template, and the template being separate and distinct from the structured data context; and
merging the at least one dynamic data item of the structured data context into the template so as to produce the dynamic web page,
wherein the merging step comprises:
traversing each dynamic data item of the structured data context that was generated; and
placing each traversed dynamic data item into a corresponding location in the template if the associated information that corresponds to the dynamic data item is found in the template, the dynamic data item being placed within the template without replacing non-content data in the template.

2. The method according to claim 1, wherein the merging step further comprises reporting error information when, after the traversing is completed, there is content to be displayed in the template that is not replaced by the at least one dynamic data item.

3. The method according to claim 1, further comprising the step of checking syntax of the template before the merging step.

4. The method according to claim 1, further comprising the step of:
   after the merging step, checking syntax of the dynamic web page that is produced.

5. The method according to claim 1,
   wherein the template is represented by a markup language, and
   the associated information contained in the template that corresponds to the at least one dynamic data item of the structured data context is recorded in an attribute of a tag in the template.

6. The method according to claim 5, wherein the template is represented by HTML, XML, or WML.

7. The method according to claim 6, wherein the associated information contained in the template that corresponds to the at least one dynamic data item of the structured data context is recorded in an ID attribute of the tag in the template.

8. A non-transitory computer-readable medium encoded with a program for generating a dynamic web page, the program comprising instructions for performing the steps of:
   generating a structured data context based on a result of a business logic process performed in response to a request from a browser, the structured data context defining at least one of a given data structure and a given data class, the structured data context including at least one dynamic data item for the dynamic web page, and the structured data context being separate and distinct from the dynamic web page and being generated prior to generating the dynamic web page;
   loading a template in response to the request, the template being able to be browsed by the browser and containing associated information that corresponds to the at least one dynamic data item of the structured data context, the associated information being recorded in an attribute of a tag in the template, and the template being separate and distinct from the structured data context; and
   merging the at least one dynamic data item of the structured data context into the template so as to produce the dynamic web page,
   wherein the merging step comprises:
      traversing each dynamic data item of the structured data context that was generated; and
      placing each traversed dynamic data item into a corresponding location in the template if the associated information that corresponds to the dynamic data item is found in the template, the dynamic data item being placed within the template without replacing non-content data in the template.

9. The non-transitory computer-readable medium according to claim 8, wherein the merging step further comprises reporting error information when, after the traversing is completed, there is content to be displayed in the template that is not replaced by the at least one dynamic data item.

10. The non-transitory computer-readable medium according to claim 8, wherein the program further comprises instructions for performing the step of checking syntax of the template before the merging step.

11. The non-transitory computer-readable medium according to claim 8,
    wherein the template is represented by a markup language, and
    the associated information contained in the template that corresponds to the at least one dynamic data item of the structured data context is recorded in an ID attribute of a tag in the template.

12. An apparatus for generating a dynamic web page, the apparatus comprising:
    a memory;
    a processor communicatively coupled to the memory;
    a business logic processing unit communicatively coupled to the memory and the processor, the business logic processing unit being configured to generate a structured data context based on a result of a business logic process performed in response to a request from a browser, the structured data context defining at least one of a given data structure and a given data class, the structured data context including at least one dynamic data item for the dynamic web page, and the structured data context being separate and distinct from the dynamic web page and being generated prior to generating the dynamic web page;
    a template loading unit configured to load a template in response to the request, the template being able to be browsed by the browser and containing associated information that corresponds to the at least one dynamic data item of the structured data context, the associated information being recorded in an attribute of a tag in the template, the template being separate and distinct from the structured data context, and at least the one dynamic data item being organized within the structured data context independent of an organization structure in the template; and
    a merging unit configured to merge the at least one dynamic data item of the structured data context into the template so as to produce the dynamic web page,
    wherein the merging unit is also configured to:
       merge the at least one dynamic data item by traversing each dynamic data item of the structured data context that was generated; and
       place each traversed dynamic data item into a corresponding location in the template if the associated information that corresponds to the dynamic data item is found in the template, the dynamic data item being placed within the template without replacing non-content data in the template.

13. The apparatus according to claim 12, wherein the merging unit comprises an error reporting unit configured to report error information when, after the traversing by the traversing unit is completed, there is content to be displayed in the template that is not replaced by the at least one dynamic data item.

14. The apparatus according to claim 12,
    wherein the template is represented by a markup language, and
    the associated information contained in the template that corresponds to the at least one dynamic data item of the structured data context is recorded in an ID attribute of a tag in the template.

15. The method according to claim 1, wherein the merging step further comprises reporting error information if the associated information that corresponds to the dynamic data item is not found in the template.

16. The non-transitory computer-readable medium according to claim 8, wherein the merging step further comprises reporting error information if the associated information that corresponds to the dynamic data item is not found in the template.

17. The apparatus according to claim 12, wherein the merging unit is also configured to report error information if the associated information that corresponds to the dynamic data item is not found in the template.

* * * * *